United States Patent
Rusciolelli et al.

(10) Patent No.: US 10,152,891 B2
(45) Date of Patent: Dec. 11, 2018

(54) SYSTEM FOR AVOIDING COLLISIONS BETWEEN AUTONOMOUS VEHICLES CONDUCTING AGRICULTURAL OPERATIONS

(71) Applicant: CNH Industrial America LLC, New Holland, PA (US)

(72) Inventors: Adam Rusciolelli, Chicago, IL (US); Tyson Dollinger, Mazon, IL (US); John Posselius, Ephrata, PA (US); Christopher A. Foster, Mohnton, PA (US); Brian Ray, Chicago, IL (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 15/144,166

(22) Filed: May 2, 2016

(65) Prior Publication Data
US 2017/0316692 A1 Nov. 2, 2017

(51) Int. Cl.
| | |
|---|---|
| *G08G 1/16* | (2006.01) |
| *G05D 1/00* | (2006.01) |
| *A01D 41/127* | (2006.01) |
| *A01B 69/04* | (2006.01) |
| *A01B 79/00* | (2006.01) |
| *A01B 79/02* | (2006.01) |

(52) U.S. Cl.
CPC ........... *G08G 1/164* (2013.01); *A01B 69/008* (2013.01); *A01B 79/005* (2013.01); *A01B 79/02* (2013.01); *A01D 41/1278* (2013.01); *G05D 1/0088* (2013.01); *G08G 1/166* (2013.01)

(58) Field of Classification Search
CPC ...... G08G 1/164; G08G 1/166; G05D 1/0088; A01B 69/008; A01B 79/005; A01B 79/02; A01D 41/1278

USPC .............................................. 701/23, 26, 50
See application file for complete search history.

(56) References Cited

U.S. PATENT DOCUMENTS

| 5,111,401 A | 5/1992 | Everett, Jr. et al. |
|---|---|---|
| 5,170,352 A | 12/1992 | McTamaney et al. |
| (Continued) | | |

FOREIGN PATENT DOCUMENTS

| EP | 1369013 | 12/2003 |
|---|---|---|
| EP | 1840690 | 10/2007 |
| EP | 2177965 | 4/2010 |

OTHER PUBLICATIONS

Scott A. Shearer et al.; "Trends in the Automation Field Machinery"; Biosystems and Agricultural Engineering; pp. 1-22; University of Kentucky, Lexington, USA (2010).

(Continued)

*Primary Examiner* — Angelina Shudy
(74) *Attorney, Agent, or Firm* — Rebecca L. Henkel; Rickard K. DeMille

(57) ABSTRACT

The present invention provides a system for conducting agricultural operations in a field using autonomous vehicles in which a collision avoidance mechanism may be provided. The system may include providing a mission plan for autonomous vehicles to conduct agricultural operations, establishing a hierarchy for the vehicles, and monitoring for an event conditions indicating vehicles are traveling toward a collision with respect to one another. Upon receiving an event condition, the system may revise the mission plan to adjust a path of one of the vehicles based on the hierarchy in order to avoid the collision.

20 Claims, 9 Drawing Sheets

(56) References Cited

U.S. PATENT DOCUMENTS

| | | | |
|---|---|---|---|
| 5,280,431 A | 1/1994 | Summerville et al. | |
| 5,375,059 A | 12/1994 | Kyrtsos et al. | |
| 5,610,821 A * | 3/1997 | Gazis | G01C 21/3492 340/990 |
| 5,646,844 A * | 7/1997 | Gudat | E01C 19/004 701/409 |
| 5,974,348 A * | 10/1999 | Rocks | G01S 1/70 348/120 |
| 5,987,383 A * | 11/1999 | Keller | A01B 69/007 342/357.36 |
| 6,128,574 A * | 10/2000 | Diekhans | A01B 79/005 701/410 |
| 6,167,337 A * | 12/2000 | Haack | E02F 9/26 222/63 |
| 6,246,932 B1 * | 6/2001 | Kageyama | G05D 1/0297 340/992 |
| 6,292,725 B1 * | 9/2001 | Kageyama | G05D 1/027 180/169 |
| 6,463,374 B1 * | 10/2002 | Keller | A01B 69/007 111/200 |
| 6,484,078 B1 * | 11/2002 | Kageyama | G05D 1/0297 340/989 |
| 6,611,755 B1 * | 8/2003 | Coffee | B28C 5/422 340/438 |
| 6,728,607 B1 * | 4/2004 | Anderson | A01B 69/008 340/995.19 |
| 6,745,126 B1 * | 6/2004 | Pavlak | A01K 5/02 701/50 |
| 6,799,100 B2 * | 9/2004 | Burns | G08G 1/207 340/436 |
| 6,941,201 B2 * | 9/2005 | Sudou | G08G 1/166 340/902 |
| 7,277,028 B1 * | 10/2007 | Janke | G08G 1/096716 340/905 |
| 7,499,776 B2 * | 3/2009 | Allard | G05D 1/0061 701/1 |
| 7,587,260 B2 | 9/2009 | Bruemmer et al. | |
| 7,742,860 B2 * | 6/2010 | Diekhans | A01B 69/007 701/410 |
| 7,873,617 B2 * | 1/2011 | Wippersteg | G06Q 10/06 707/705 |
| 7,899,584 B2 * | 3/2011 | Schricker | G08G 1/20 701/1 |
| 7,966,106 B2 * | 6/2011 | Sudou | G05D 1/0272 701/23 |
| 8,020,657 B2 | 9/2011 | Allard et al. | |
| 8,050,863 B2 | 11/2011 | Trepagnier et al. | |
| 8,082,097 B2 * | 12/2011 | Hilliar Isaacson | G01C 21/20 455/456.1 |
| 8,095,279 B2 * | 1/2012 | Greiner | G06Q 10/047 340/439 |
| 8,125,529 B2 * | 2/2012 | Skoskiewicz | H04N 5/232 348/116 |
| 8,195,342 B2 * | 6/2012 | Anderson | G05D 1/0088 700/253 |
| 8,200,428 B2 * | 6/2012 | Anderson | G05D 1/0287 701/453 |
| 8,396,597 B2 | 3/2013 | Anderson | |
| 8,428,829 B2 * | 4/2013 | Brunnert | A01D 43/087 56/10.2 F |
| 8,437,901 B2 | 5/2013 | Anderson | |
| 8,452,448 B2 | 5/2013 | Pack et al. | |
| 8,478,493 B2 * | 7/2013 | Anderson | G05D 1/024 37/348 |
| 8,548,664 B2 * | 10/2013 | Uchida | G05D 1/0297 340/905 |
| 8,589,013 B2 * | 11/2013 | Pieper | G05D 1/0214 56/10.2 R |
| 8,639,408 B2 * | 1/2014 | Anderson | G05D 1/0088 701/1 |
| 8,744,626 B2 * | 6/2014 | Johnson | A01D 34/008 700/250 |
| 8,755,976 B2 * | 6/2014 | Peters | A01B 69/008 382/106 |
| 8,788,121 B2 * | 7/2014 | Klinger | G05D 1/104 701/3 |
| 8,818,567 B2 * | 8/2014 | Anderson | G05D 1/0088 701/2 |
| 8,868,304 B2 * | 10/2014 | Bonefas | B65G 67/24 701/117 |
| 8,983,707 B2 * | 3/2015 | Everett | E02F 9/2045 701/23 |
| 9,188,986 B2 * | 11/2015 | Baumann | G05D 1/0289 |
| 9,392,746 B2 * | 7/2016 | Darr | A01D 43/073 |
| 9,420,737 B2 * | 8/2016 | Spiller | A01B 69/008 |
| 9,772,625 B2 * | 9/2017 | Gilmore | G05B 15/02 |
| 9,858,818 B2 * | 1/2018 | Shibata | G08G 1/162 |
| 9,968,024 B2 * | 5/2018 | Haneda | A01G 25/09 |
| 2001/0044697 A1 | 11/2001 | Kageyama | B60W 40/04 701/301 |
| 2002/0072850 A1 * | 6/2002 | McClure | A01B 69/008 701/25 |
| 2002/0135467 A1 * | 9/2002 | Koike | G01S 5/0072 340/436 |
| 2002/0165645 A1 * | 11/2002 | Kageyama | B60W 40/04 701/1 |
| 2002/0165649 A1 | 11/2002 | Wilhelm Rekow et al. | |
| 2003/0060968 A1 * | 3/2003 | MacPhail | G08G 1/0104 701/117 |
| 2003/0187577 A1 * | 10/2003 | McClure | A01B 69/008 701/23 |
| 2005/0273253 A1 * | 12/2005 | Diekhans | G01C 21/20 701/50 |
| 2006/0047418 A1 * | 3/2006 | Metzler | A01B 69/007 701/469 |
| 2006/0178825 A1 * | 8/2006 | Eglington | A01B 69/008 701/410 |
| 2006/0249321 A1 * | 11/2006 | Cook | E21C 35/24 180/168 |
| 2007/0035416 A1 * | 2/2007 | Tanaka | B60T 7/18 340/906 |
| 2007/0239337 A1 * | 10/2007 | Anderson | A01B 79/005 701/50 |
| 2008/0059007 A1 * | 3/2008 | Whittaker | G05D 1/0274 701/2 |
| 2009/0088916 A1 | 4/2009 | Elgersma et al. | |
| 2010/0017046 A1 * | 1/2010 | Cheung | G01S 7/003 701/2 |
| 2010/0042247 A1 * | 2/2010 | Starr | G05B 19/41865 700/214 |
| 2010/0042257 A1 * | 2/2010 | Starr | G06F 3/0605 700/248 |
| 2010/0076631 A1 | 3/2010 | Mian | |
| 2010/0094499 A1 * | 4/2010 | Anderson | G05D 1/0088 701/23 |
| 2010/0163621 A1 * | 7/2010 | Ben-Asher | G05D 1/104 235/412 |
| 2010/0201829 A1 * | 8/2010 | Skoskiewicz | G08G 1/04 348/211.2 |
| 2010/0324771 A1 * | 12/2010 | Yabushita | G05D 1/024 701/25 |
| 2011/0112730 A1 * | 5/2011 | Rekow | G05D 1/0219 701/50 |
| 2011/0295424 A1 * | 12/2011 | Johnson | A01D 34/008 700/248 |
| 2012/0095651 A1 * | 4/2012 | Anderson | G05D 1/0274 701/50 |
| 2012/0174445 A1 * | 7/2012 | Jones | A01B 69/007 37/197 |
| 2012/0316725 A1 * | 12/2012 | Trepagnier | G01S 17/023 701/26 |
| 2013/0046525 A1 * | 2/2013 | Ali | A01B 79/005 703/6 |
| 2013/0238170 A1 | 9/2013 | Klinger | |
| 2013/0325242 A1 * | 12/2013 | Cavender-Bares | A01C 21/002 701/25 |

(56) References Cited

U.S. PATENT DOCUMENTS

| | | | |
|---|---|---|---|
| 2015/0025752 A1* | 1/2015 | Tolstedt | A01C 21/005 701/50 |
| 2015/0094944 A1 | 4/2015 | Baumann | |
| 2015/0173297 A1* | 6/2015 | Pitzer | A01D 46/30 56/1 |
| 2015/0336669 A1* | 11/2015 | Kantor | G01C 21/3415 701/3 |
| 2015/0362922 A1* | 12/2015 | Dollinger | A01B 69/008 701/2 |
| 2016/0021813 A1* | 1/2016 | Matthews | A01B 79/005 701/26 |
| 2016/0057920 A1* | 3/2016 | Spiller | A01B 69/008 701/23 |
| 2016/0071410 A1* | 3/2016 | Rupp | G06Q 50/02 701/50 |
| 2016/0117936 A1 | 4/2016 | Klinger et al. | |
| 2016/0148511 A1* | 5/2016 | Shibata | G08G 1/162 701/119 |
| 2016/0157428 A1* | 6/2016 | Pitzer | A01D 46/30 701/50 |
| 2016/0157431 A1* | 6/2016 | Pitzer | A01D 46/30 56/331 |
| 2017/0082452 A1* | 3/2017 | Sumizawa | B60W 30/10 |
| 2017/0102702 A1* | 4/2017 | Ishijima | A01B 69/008 |
| 2017/0138732 A1* | 5/2017 | Pettersson | B64C 39/024 |
| 2017/0160748 A1* | 6/2017 | Nakagawaa | A01B 69/00 |
| 2017/0276492 A1* | 9/2017 | Ramasamy | G01C 21/34 |
| 2017/0280614 A1* | 10/2017 | Turpin | A01B 79/005 |
| 2017/0292854 A1* | 10/2017 | Zhang | G01C 21/3685 |
| 2017/0311534 A1* | 11/2017 | Rusciolelli | A01B 79/005 |
| 2017/0318735 A1* | 11/2017 | Foster | A01B 76/00 |
| 2018/0024549 A1* | 1/2018 | Hurd | G05D 1/0022 |

OTHER PUBLICATIONS

NPL—Mousazadeh; "A technical review on navigation systems of agricultural autonomous off-road vehicles"; website—<http://www.sciencedirect.com/science/article/pii/S0022489813000220>; pp. 1-2; Apr. 2013: US.

NPL—Vougioukas; "A distributed control framework for motion coordination of teams of autonomous agricultural vehicles"; website—http://www.sciencedirect.com/science/article/pii/S153751101200150X; pp. 1-3; Oct. 2012; US.

* cited by examiner

SYSTEM FOR AVOIDING COLLISIONS BETWEEN AUTONOMOUS VEHICLES CONDUCTING AGRICULTURAL OPERATIONS

FIELD OF THE INVENTION

The invention relates generally to systems for conducting agricultural operations, and in particular, to a system for avoiding collisions between autonomous vehicles conducting agricultural operations by establishing a hierarchy between vehicles and modifying paths of lower priority vehicles traveling toward collisions based on the hierarchy.

BACKGROUND OF THE INVENTION

Agricultural operations in large fields often require significant amounts of resources and careful planning in order to provide the most effective results. Depending on the type of field and/or season, one or more tractors, tillers, harvesters, sprayers, balers or other implements may be required to efficiently perform various agricultural operations. Moreover, such operations may be required to be performed in certain orders, such as harvesting before tilling, or tilling before planting.

However, various hazards may occur which may compromise even the most careful planning. Such hazards may include one agricultural vehicle traveling toward a collision with another agricultural vehicle in the field. This situation may occur, for example, when one agricultural vehicle is required to deviate from a planned path in order to avoid a collision with an unexpected obstacle, and the deviation inadvertently puts the vehicle on a collision path with another vehicle. Consequently, what is needed is an improved system for deploying agricultural equipment to perform necessary operations in a field which may help to reduce the possibility of collisions.

SUMMARY OF THE INVENTION

The present invention provides a system for conducting agricultural operations in a field using autonomous vehicles in which a collision avoidance mechanism may be provided. The system may include providing a mission plan for autonomous vehicles to conduct agricultural operations, establishing a hierarchy for the vehicles, and monitoring for an event conditions indicating vehicles are traveling toward a collision with respect to one another. Upon receiving an event condition, the system may revise the mission plan to adjust a path of one of the vehicles based on the hierarchy in order to avoid the collision.

Autonomous vehicle control systems typically include a localized control system on the vehicle itself, and a back-office/base station command and control system located at another location away from the vehicle. The back office/base station is typically connected to the vehicle via a long range radio communication system (which may allow communication >1 mile). If there are multiple vehicles in the system, they may also be interconnected via a short range communication system (which may allow communication <1 mile). A localized base station might also be located in the field which could also connect to the short range communication system. In one aspect, the back-office/base station and/or localized base station could be implemented by an autonomous vehicle.

The back office is typically where the majority of data used for mission planning and construction is stored. This data could comprise, for example, of Geographical Information System (GIS) maps of a farm/fields, an equipment library (including information providing an equipment inventory, equipment geometries and/or specifications), equipment break-down/service status, weather maps/forecasts, yield maps, soil maps, nutrient maps, prescription maps/rates (such as for fertilizer, seed, manure, herbicide, and the like), radio coverage maps, satellite images, historical data (which may be records from prior years or seasons), and so forth. The equipment library in particular may contain information on all of the equipment which may be available to complete a mission (such as tractors, implements, harvesters, sprayers, and the like, on the farm).

Each vehicle which may be used in agricultural operations, or actively involved in agricultural operations, may be placed in a hierarchy (ranked). This hierarchy may be used for conflict resolution to determine which vehicle has the right of way and which vehicle will give way.

As part of the optimization, the back office/base station may also execute a collision avoidance process. The purpose of this process is to make sure vehicles performing the same or similar operations are not put in a situation where they could collide and cause damage to one another. A collision could occur, for example, if vehicles are travelling in opposite directions on the same path or adjacent paths. This condition can be analyzed when a mission is constructed, and may also be run in real time as there may be problems which cause deviations from the initial mission plan. As the mission is updated and re-optimized due to deviations, the collision avoidance process may be executed again. To avoid a collision, the collision avoidance process may analyze a current pass of each vehicle and a next planned pass of each vehicle, and may compare this analysis to the current pass and next planned passes of all vehicles performing operations in the same field. If it discovers that any vehicles may pass in opposite directions on the same or adjacent paths, the collision avoidance process may re-plan the path for one of the vehicles involved in the potential collision. When a potential collision is identified, a vehicle with a lower rank in the hierarchy may execute one of several possible avoidance strategies, such as moving to a new path/pass that will avoid the collision, or stopping and waiting at the end of a current pass. If a collision avoidance maneuver is executed, it is likely that as a result the remaining portion of the mission may benefit from a re-construction and re-optimization.

One path planning scenario may be to have two or more vehicles performing the same operation, working in the same field together use a leader-follower approach. The lead vehicle may run ahead while one or more following vehicles operate on adjacent passes. If there are multiple following vehicles, each may follow the lead vehicle in a staggered pattern, such as follower 1 adjacent to and behind the leader, follower 2 adjacent to and behind follower 1, and so forth. At the headlands, or areas at each end of the field, the lead vehicle may move over a number of passes equivalent to the total number of vehicles to avoid any potential collisions by being on adjacent passes in opposite directions of travel. Each follower may then move into the same relative position for the next pass.

For a single vehicle working in a field, or for a field carved into a number of blocks/areas equivalent to the number of vehicles operating in the field, each individual vehicle may be assigned its own block/area. Accordingly, each vehicle may follow a pre-assigned coverage plan (alternating, "skip N," adjacent, lands, or the like). Collision avoidance processes may only need to be run on the boundaries between blocks/areas.

If an obstacle is known or detected on one of the vehicle passes and requires a deviation/avoidance path that overlaps or crosses over another vehicle pass in the field then the vehicle performing the avoidance path will have to check the new path against the paths of other nearby vehicles to make sure there is no potential for collision.

In addition, when there are multiple vehicles in the same field performing different operations, it may be important that certain field operations be performed in a specific order. Accordingly, a vehicle performing a first field operation may be required to cover an area before a vehicle performing a second field operation covers the same area. The field map for the second field operation may have, for example, three operational regions: no coverage; covered by the first field operation only; and covered by both the first and second field operations. The operational field shape and size for the vehicle performing the second field operation may evolve as the vehicle performing the first field operation covers the field. The mission plan for the second field operation may consider, for example: total field area, area covered by first field operation, planned future path(s) for first field operation, pass width(s) of first field operation, pass width(s) of second field operation, work rate (acres/hour) of first field operation, work rate of second field operation, and so forth. From a pass-to-pass stand point, the second vehicle will have to check and make sure that the first operation has already been performed over the area of the second vehicle's next planned pass. If not, then the second vehicle will have to plan a new pass on an area already covered by the first field operation, or wait until the first vehicle has covered enough area to plan a new pass.

In certain aspects, autonomous vehicles may be mixed with human operated vehicles, and the system may be managed and controlled from another vehicle in the field instead of from a remote base station. Such variations are within the scope of the invention.

Specifically then, in one aspect, a method for conducting an agricultural operation including: (a) providing a mission plan for first and second autonomous vehicles, the mission plan including first and second paths for the first and second autonomous vehicles to travel while performing first and second agricultural operations, respectively; (b) establishing a hierarchy in which the first autonomous vehicle is prioritized above the second autonomous vehicle; (c) monitoring for an event condition reported by at least one of the first and second autonomous vehicles, the event condition being a detection of the first and second autonomous vehicles traveling toward a collision with respect to one another; and (d) upon receiving the event condition, providing a revised mission plan for the second autonomous vehicle in which the revised mission plan adjusts the second path of the second autonomous vehicle based on the hierarchy to avoid the collision.

Another aspect may provide a system for managing an agricultural operation, the system including a processor executing a program stored in a non-transient medium operable to: (a) provide a mission plan for first and second autonomous vehicles, the mission plan including first and second paths for the first and second autonomous vehicles to travel while performing first and second agricultural operations, respectively; (b) establish a hierarchy wherein the first autonomous vehicle is prioritized above the second autonomous vehicle; (c) monitor for an event condition reported by at least one of the first and second autonomous vehicles, the event condition being a detection of the first and second autonomous vehicles traveling toward a collision with respect to one another; and (d) upon receiving the event condition, provide a revised mission plan for the second autonomous vehicle in which the revised mission plan adjusts the second path of the second autonomous vehicle based on the hierarchy to avoid the collision.

Other aspects, objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

DETAILED DESCRIPTION OF THE DRAWINGS

Figure 1:
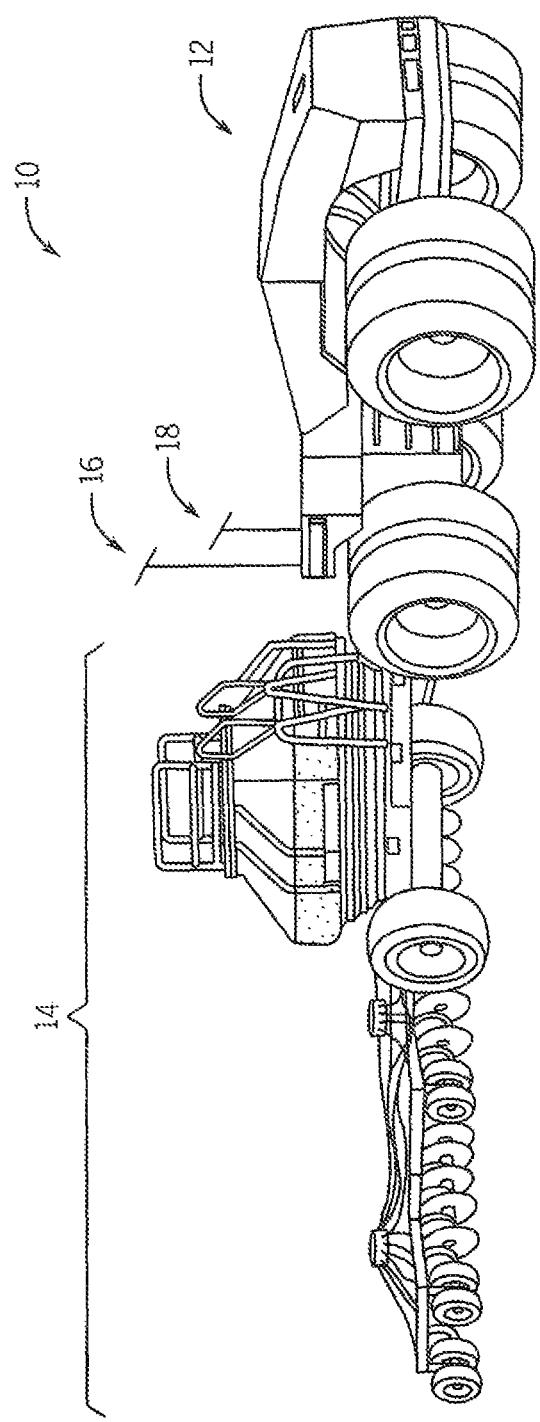
FIG. 1 is an isometric view of exemplar agricultural equipment which may include an autonomous vehicle and agricultural machinery in accordance with an aspect of the invention.

Referring now to FIG. 1, an isometric view of an autonomous vehicle shown as agricultural vehicle 10 including an autonomous drive portion 12 and agricultural machinery 14 is shown by way of example. The vehicle 10 may operate "autonomously" meaning that it may be capable of sensing an environment and driving, steering, stopping and otherwise operating without direct human input. Accordingly, without physical presence of a human operator, the vehicle 10 may be used to autonomously perform one or more agricultural operations in a field using the agricultural machinery 14, which machinery could be, for example, an air cart and a drill for planting operations as illustrated. Other types of agricultural machinery may include, for example, tillers, harvesters, sprayers, balers and/or other implements, which machinery may be positioned and mounted with respect to the vehicle 10 in various configurations as may be required for performing particular agricultural operations.

The vehicle 10 may also include a long range antenna 16 for communicating with a base station (which may be >1 mile) and a short range antenna 18 for communicating with other vehicles and/or a localized base station in the field (which may be <1 mile). Such communications may be accomplished via radio communications transmitted and received on varying bands.

Figure 2:
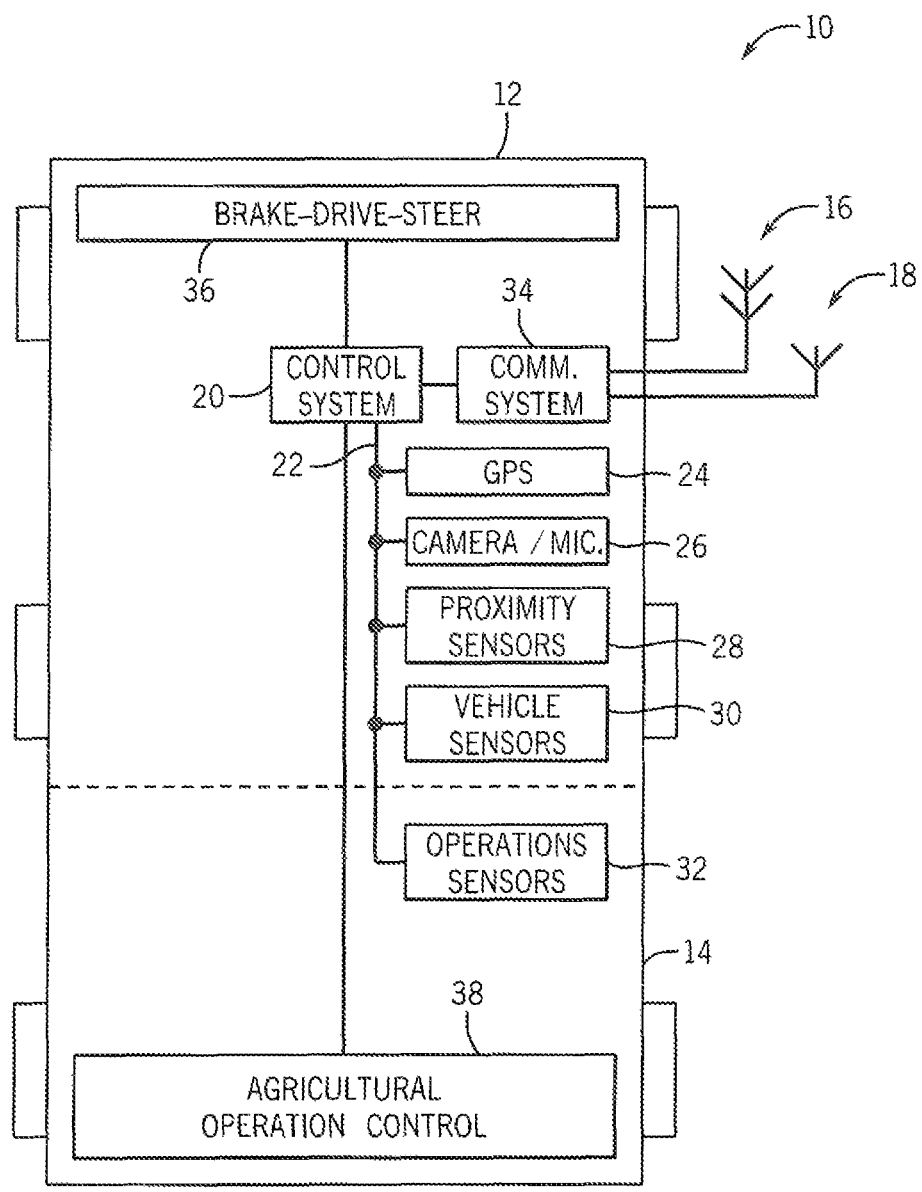
FIG. 2 is diagram of exemplar agricultural equipment which may include an autonomous vehicle and agricultural machinery in accordance with an aspect of the invention.

Referring now to FIG. 2, a diagram of the exemplar agricultural equipment 10 is provided in accordance with an aspect of the invention. The vehicle 10 includes a control system 20 for autonomously controlling the vehicle 10 and the agricultural machinery 14. The control system 20 may be in communication with numerous sensors and devices via a sensor bus 22. Sensors and devices may include, for example, a Global Positioning System (GPS) and/or other position sensor 24 for accurately determining its location, a camera and/or microphone 26, proximity sensors 28 (such as radar) for detecting nearby objects, and vehicle sensors 30 for detecting various statuses of the vehicle 10 such as vehicle speed, engine speed, steering angle, pitch, roll and yaw angles, fuel level, oil pressure, tire pressures, and the like. The control system 20 may also be in communication with agricultural machinery sensors 32 of the agricultural machinery 14 via the sensor bus 22. Agricultural machinery sensors 32 may include, for example, many sensors redundant to the vehicle sensors 30, such as vehicle speed, steering angle, pitch, roll and yaw angles, tire pressures, and the like, and may also include agricultural machine specific sensors, such as sensing an amount of agricultural product collected (such as a bin being full for harvesters), and an amount of agricultural product dispensed (such as liters sprayed for sprayers), an amount of agricultural product remaining (such as a weight of seeds held in an air cart for planters), and the like.

The control system 20 may also be in communication with a communication system 34, a drive system 36, and an agricultural operation control system 38. The communication system 34 may allow communication with the base station via the long range antenna 16 and/or communication with other vehicles and/or a localized base station via the short range antenna 18. The drive system 36 may allow for general operation of the vehicle 10 by the control system 20 without the physical presence of a human operator, such as braking, accelerating, steering, shifting, and the like. The agricultural operation control system 38 may allow for general operation of the agricultural machinery 14 by the control system 20, such as collecting an agricultural product (such as for harvesting), dispensing an agricultural product (such as for planting or spraying), actuating an agricultural product (such as for cutting or raking) and the like.

Figure 3:
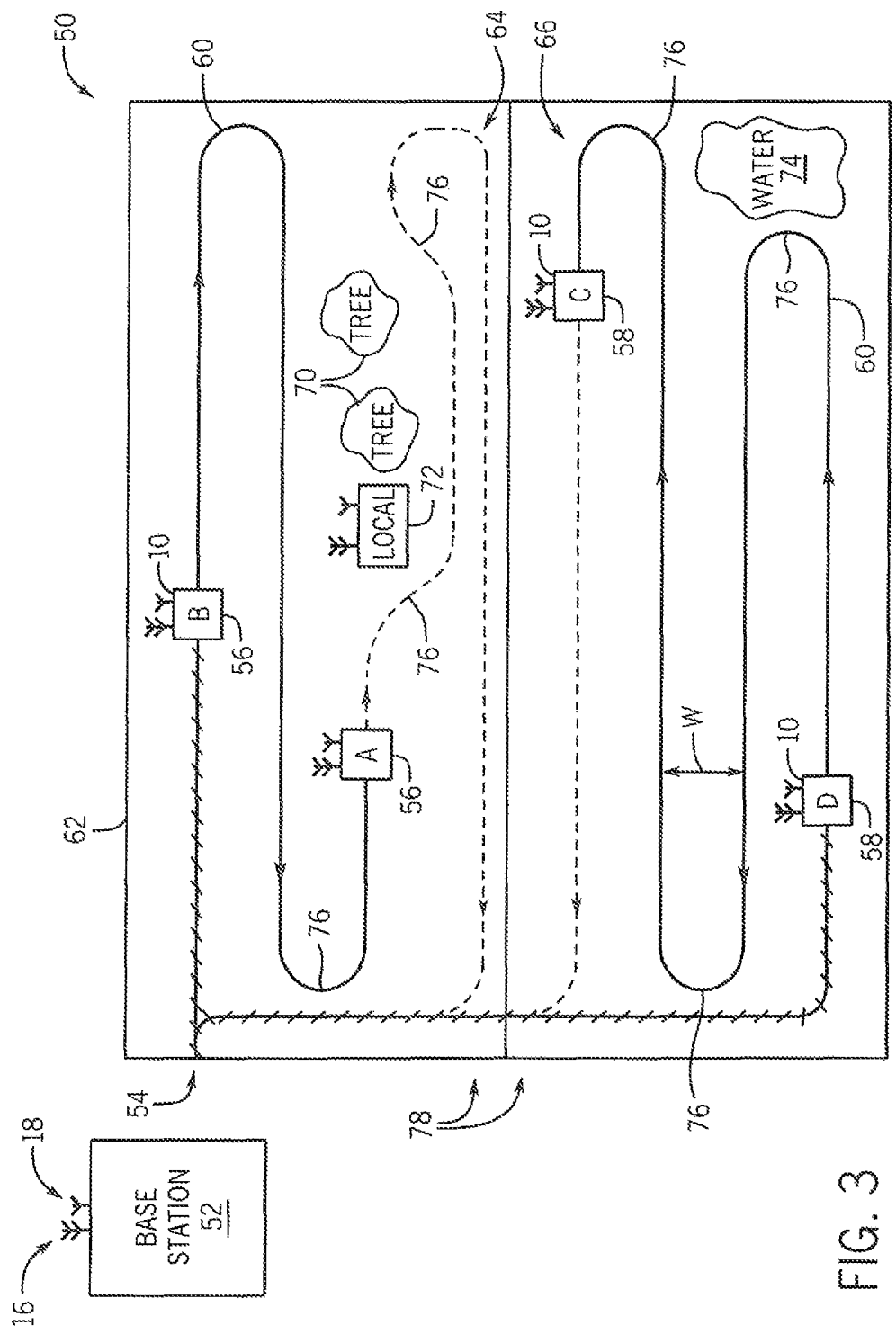
FIG. 3 is a diagram of an exemplar mission plan for execution in an agricultural field using multiple vehicles in accordance with an aspect of the invention.

Referring now to FIG. 3, a diagram of an exemplar mission plan for execution in an agricultural field 50 using multiple vehicles 10 (such as vehicles "A," "B," "C" and "D" shown by way of example) is provided in accordance with an aspect of the invention. A base station 52 may be in communication with the vehicles 10 via the long range antenna 16 when the vehicles 10 are far away from the base station 52. The base station 52 may also communicate or otherwise monitor the vehicles 10 via the short range antenna 18 with improved quality when the vehicles 10 are closer to the base station 52. The base station 52 may be where the majority of data used for mission planning and construction is stored.

For conducting agricultural operations in the field 50, vehicles 10, labeled "A," "B," "C" and "D" in FIG. 3 by way of example, may be deployed at one or more predetermined entry points 54. In this example, the vehicles 10 may be configured to operate in a first team 56 with A leading and B following, and a second team 58 with C leading and D following. In each team, according to the mission plan, the lead vehicle (A or C) may conduct a first agricultural operation in an area of the field 50 before a following vehicle (B or D) may conduct a second agricultural operation in the same area. For example, the lead vehicle (A or C) may be a harvester for harvesting crops, and the following vehicle (B or D) may be a tiller for tilling the ground after the crops have been harvested.

Each vehicle 10 may autonomously travel a path 60 in the field 50 while performing an agricultural operation according to the mission plan. The paths 60 may be bounded by a field line 62 (which may also include a fence) and/or demarcated sections of the field 50, such as a first section 64 for the first team 56 to operate, and a second section 66 for the second team 58 to operate. In one aspect, the vehicles 10 may operate systematically in rows, back and forth, each row having a width "W" determined to accommodate the vehicles 10 for maximum farming production. The mission plan may take into account known or expected obstacles in the field 50, such as trees 70, a local base station 72, or a water formation 74, such that the paths 60 may be arranged in advance with turns 76 to avoid such obstacles in completing rows of a section.

While the vehicles 10 are conducting their agricultural operations, they may each provide progress information to the base station 52. The progress information may indicate progress with respect to the agricultural operation the vehicle 10 has been assigned. Accordingly, such progress information may include reporting a current position of the vehicle 10 with respect to the path 60, reporting an amount of agricultural product collected, reporting an amount of agricultural product dispensed, and so forth. For example, vehicle A may report its precise GPS location corresponding to nearing completion of the third row of the first section 64 with a specific amount of crop harvested, and vehicle B may report its precise GPS location corresponding to a distance behind vehicle A, nearing completion of the first row of the first section 64, with tilling in progress. Upon completion of the agricultural operations, the vehicles 10 may exit the field 50 at one or more predetermined egress points 78.

Figure 4:
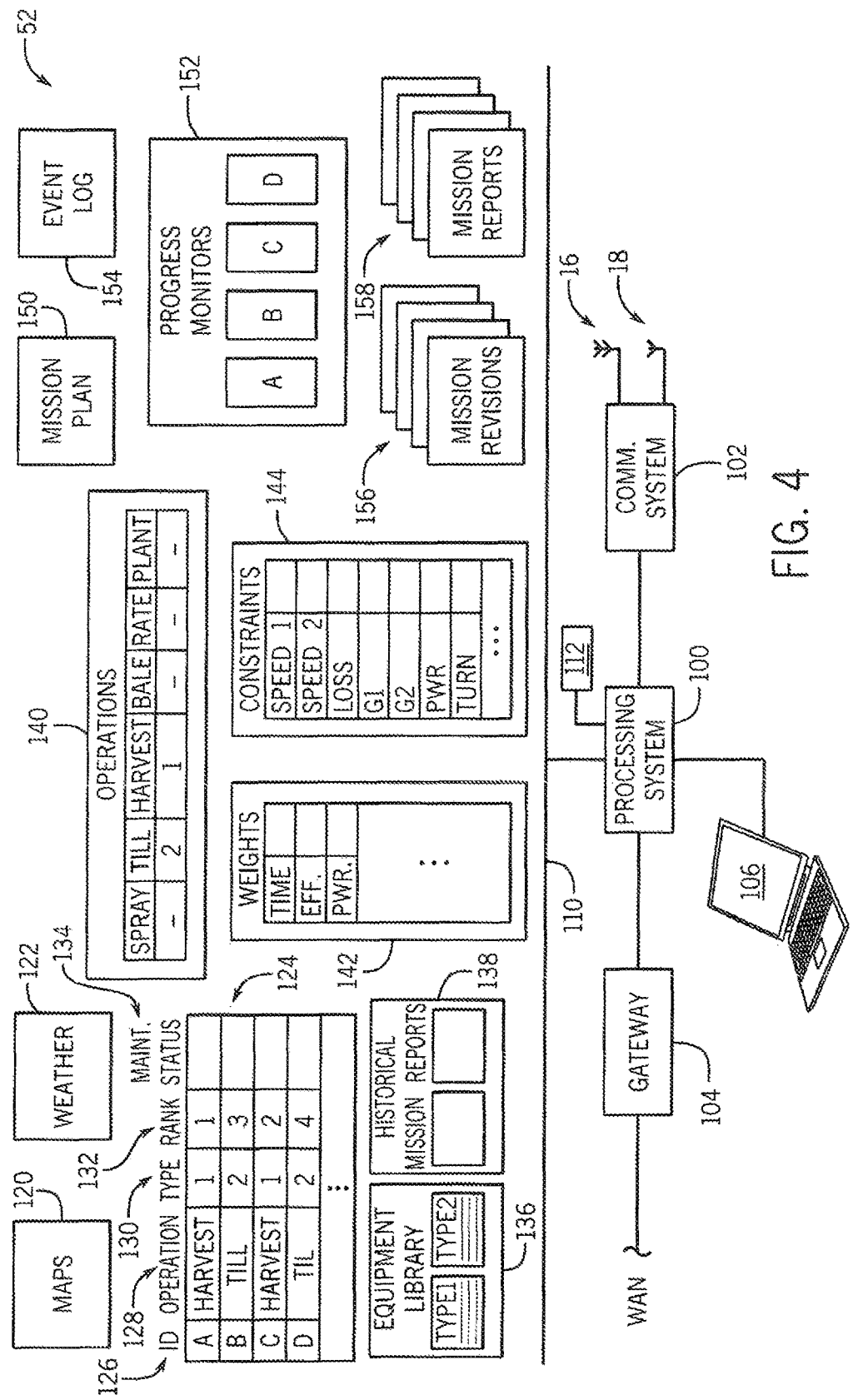
FIG. 4 is diagram of an exemplar base station for conducting the agricultural operations of FIG. 3.

Referring now to FIG. 4, a diagram of the base station 52 for conducting the agricultural operations of FIG. 3 is provided in accordance with an aspect of the invention. The base station 52 may include a computer processing system 100 in communication with a base station communication system 102 and a gateway 104 or network access. The base station communication system 102 may allow communication between the vehicles 10 and the computer processing system 100 via the long range antenna 16. The base station communication system 102 may also allow communication between the vehicles 10 and the computer processing system 100, or otherwise monitoring of the vehicles 10, via the short range antenna 18 with improved quality when the vehicles 10 are closer to the base station 52. The gateway 104 may allow communications between the computer processing system 100 and another network, such as a Wide Area Network (WAN) or the Internet, and may include an implemented security protocol or firewall. The computer processing system 100 may also be in communication with a user input/output (I/O) terminal 106 which may provide a graphic display, keyboard, mouse and/or other I/O for an operator to control the system.

In one aspect of the invention, the base station 52 may conduct agricultural operations in the field 50 via the computer processing system 100. The computer processing system 100 may store multiple data structures 110 in a computer readable non-transient medium, such as a Random Access Memory (RAM), Flash memory or disk for conducting the agricultural operations. The computer processing system 100 may also execute a program 112 stored in the same or different computer readable non-transient medium to provide the mission plan for the vehicles 10, receive progress information from the vehicles 10, monitor for event conditions, which may be reported by the vehicles 10, and provide revised mission plans for the vehicles 10 as necessary.

All relevant data for mission planning and construction may be initially collected in the data structures 110. The data structures 110 may include: one or more maps 120, which may include GIS maps of the field 50, yield maps, soil maps, nutrient maps, prescription maps/rates (such as for fertilizer, seed, manure, herbicide, and the like), radio coverage maps, satellite images, and the like; weather maps 122, which may include weather forecast data received over the WAN; an inventory record 124 of the vehicles 10 and/or other equipment available in the system, which may include for each vehicle 10 an equipment break-down, such as a unique identifier 126, a selected agricultural operation 128, an equipment type 130, a relative hierarchy or rank 132 with respect to other vehicles 10, and/or a maintenance status 134 or service schedule; an equipment library 136, including information providing equipment geometries and/or specifications for each type of vehicle 10 in the inventory record 124 corresponding to the equipment type 130; and historical data 138, which may include mission reports reported by vehicles 10 from previous agricultural operations.

The data structures 110 may also include data structures which may receive user input for generating mission plans (such as via the I/O terminal 106) including, for example, an operation selection field 140, weights 142 and constraints 144. The operation selection field 140 may allow a user to select desired one or more desired agricultural operations to complete for accomplishing a particular mission plan, such as spraying, tilling, harvesting, baling, raking and/or planting. A user may also select a desired order for such agricultural operations, such as harvesting (selected as "1") to be completed in areas first followed by tilling (selected as "2"), with inapplicable operations left unselected.

The weights 142 and the constraints 144 may be used in the mission planning and construction to control the optimization of the mission plan. Values for each of the weights 142 may be assigned. The weights 142 may include, for example: an importance of completion time (or overall time for mission execution) ("Time"); an importance of agricultural efficiency of a mission goal (such as planting accuracy, harvest losses or spraying accuracy) ("Efficiency"); an importance of power/torque reserve during operation ("Power"); and so forth. The sum of all of the weights 142 will normally be equal to one.

The constraints 144 could include, for example: requiring a maximum speed while performing a field operation (such as harvesting, planting, tillage or unloading on-the-go) ("Speed 1"); requiring a maximum speed during headland turns (areas at each end of the field) ("Speed 2"); requiring a maximum harvest loss limit ("Loss"); requiring a maximum force exertion ("G1") and/or maximum force duration ("G2") for motion of the vehicles 10 (such as for management of a power hop or working on rough ground); requiring a minimum turning radius on headlands ("Turn"); requiring a maximum power/torque limit ("Power"); and so forth.

The data structures 110 may also include data structures to be communicated to the vehicles 10 and/or to be updated based on information received by the vehicles 10 including, for example, a mission plan 150, progress monitors 152, an event log 154, mission revisions 156 and mission reports 158. The mission plan 150 providing a mission plan for an autonomous vehicle, the mission plan may provide the paths for each of the vehicles 10 and/or other equipment to travel while performing particular agricultural operations in the field, including as described above by way of example in FIG. 3. The progress monitors 152 may be continuously or periodically updated upon receiving progress information from the vehicles 10, such as vehicles A, B, C and D as described above in FIG. 3. Progress information may include, for example, a position of each vehicle with respect to its assigned path, an amount of agricultural product collected, an amount of agricultural product dispensed, and so forth. The event log 154 may track event conditions reported by the vehicles 10 and/or other equipment being monitored in the system. Event conditions may include, for example, an obstacle being detected in the path of a vehicle 10, an oncoming vehicle being detected in the path or an adjacent path of a vehicle 10, a disablement or other condition of a vehicle 10, and so forth.

One or more mission revisions 156 may be provided by the system from time to time to update one or more portions of the mission plan 150 (such as specific paths for specific vehicles) and/or to replace all of the mission plan 150. Mission revisions 156 may typically be provided, for example, upon receiving an event condition being tracked in the event log 154. Mission revisions 156 may typically adjust paths of one or more vehicles 10 to resolve event conditions being monitored, though mission revisions 156 may be provided for other reasons.

Each of the aforementioned data structures 110 may be updated from time to time, such as via the gateway 104 and the WAN, to provide updated information, such as current weather reports, updated equipment data, and the like.

Figure 5:
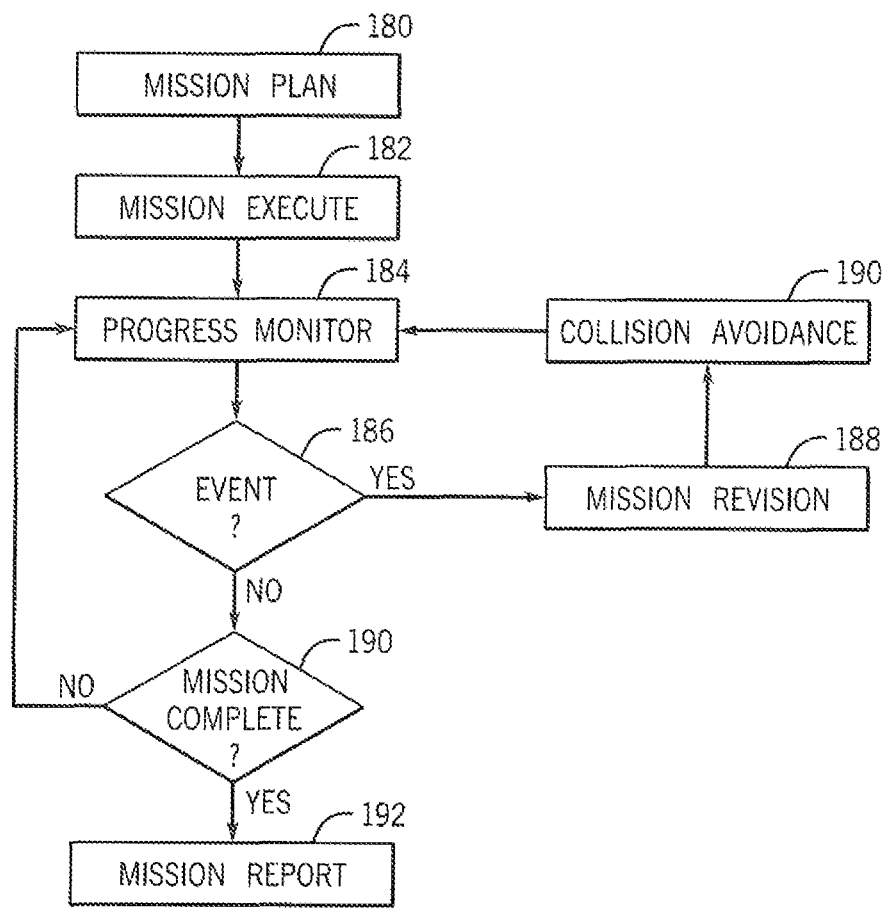
FIG. 5 is a flow chart illustrating a system for conducting an agricultural operation in a field using an autonomous vehicle in accordance with an aspect of the invention.

Referring now to FIG. 5, a flow chart illustrating a system for conducting an agricultural operation in a field using an autonomous vehicle is provided in accordance with an aspect of the invention. The system may be implemented by a single agricultural vehicle 10, or may be distributed among multiple agricultural vehicles 10, or may be implemented by one or more agricultural vehicles 10 acting in conjunction with a base station as will be described by way of example. In block 180, initial construction and optimization of a mission plan may be completed. The mission plan may be created based on the data structures 110 and the program 112 described above with respect to FIG. 4. This may be accomplished, for example, in a back office/base station by running a number of simulations to optimize the operation based on a set of weights, constraints and priorities (such as with respect to time, available equipment, cost, and so forth) which may be set by an operator. The operator could set additional constraints limiting the scope of possible scenarios, such as selecting a "Skip N" for a coverage pattern. Accordingly, the mission plan will include a path for each vehicle 10 to travel while performing an agricultural operation. Each vehicle 10 may also be placed in a hierarchy (ranked). This hierarchy may be used for conflict resolution to determine which vehicle 10 will have the right of way and which vehicle 10 will give way for collision avoidance.

Next, in block 182, the mission plan is transmitted to the vehicles 10 required to complete the mission plan at the appropriate times. The vehicles 10 then deploy in the field and travel their assigned paths while performing their assigned agricultural operations.

When there are multiple vehicles 10 in the same field performing different operations, it may be important that certain field operations be performed in a specific order. Accordingly, a vehicle 10 performing a first field operation may be required to cover an area before a vehicle performing a second field operation covers the same area. The field map for the second field operation may have, for example, three operational regions: no coverage; covered by the first field operation only; and covered by both the first and second field operations. The operational field shape and size for the vehicle performing the second field operation may evolve as the vehicle performing the first field operation covers the field. The mission plan for the second field operation may consider, for example: total field area, area covered by first field operation, planned future path(s) for first field operation, pass width(s) of first field operation, pass width(s) of second field operation, work rate (acres/hour) of first field operation, work rate of second field operation, and so forth.

Next, in block 184, while the vehicles 10 are deployed, the vehicles 10 may report progress information to the base station, which may include, for example, a position of each vehicle 10 with respect to its assigned path, an amount of agricultural product collected, an amount of agricultural product dispensed, and so forth. The base station receiving the progress information may track the progress information for providing optimizations in subsequent mission revisions.

Next, while monitoring for event conditions, in decision block 186 the base station determines if an event condition has been reported. During execution of a mission, there may be events which cause deviations from the initial mission plan, such as equipment break down, an obstacle detected that stops a vehicle, a grain tank being full on harvester, and so forth. When such a deviation from the current mission plan occur the current mission may need to be re-constructed and re-optimized with an updated set of constraints, such as an area already covered, a particular piece of equipment unavailable due to a break-down, and so forth. Event conditions may typically be reported by vehicles 10, though other mechanisms may be provided for reporting event conditions, such as the local base station 72, or a weather update via the gateway 104 and the weather map 122.

If an event condition has been reported, the process may proceed to block 188 in which a revised mission plan may be provided. The revised mission plan may adjust the path of one or more of the vehicles 10 to resolve the event condition. The revised mission plan may also provide an optimization based on current agricultural conditions, such as those reported by the progress information in block 184. The revised mission plan may be communicated to only the vehicles 10 necessary to implement the revised mission plan or may be communicated to all of the vehicles 10 for greater consistency.

Next, in block 190, as part of the optimization, the base station may also execute a collision avoidance process. To avoid a collision, the collision avoidance process may analyze a current pass of each vehicle and a next planned pass of each vehicle, and may compare this analysis to the current pass and next planned passes of all vehicles performing operations in the same field. If it discovers that any vehicles may pass in opposite directions on the same or adjacent paths, the collision avoidance process may re-plan the path for one of the vehicles involved in the potential collision. When a potential collision is identified, a vehicle with a lower rank in the hierarchy may execute one of several possible avoidance strategies, such as moving to a new path/pass that will avoid the collision, or stopping and waiting at the end of a current pass. Having provided a mission revision to resolve the event condition and having verified collision avoidance, the process may return again to block 184 for receiving progress information, then decision block 186 for determining if an event condition has been reported.

However, following decision block 186, if an event condition has not been reported, the process may proceed to decision block 190 in which the base station determines if the mission has been completed. The base station may make this determination by applying one or more factors, including comparing progress information received from the vehicles 10 to the current mission plan, monitoring a completion time and/or monitoring for mission reports from the vehicles 10. If the mission has been completed, in block 192, the base station may receive mission reports from the vehicles 10, each mission report indicating completion of the mission by a particular vehicle 10. Mission reports may include final progress information, a date/time stamp and/or a report of sensor readings from sensors described above with respect to FIG. 2. Mission reports may then be used as historical mission reports for preparing new mission plans at a later date. However, following decision block 190, if the mission has not been completed, the process may return again to block 184 for receiving progress information, then decision block 186 for determining if an event condition has been reported. As previously described, all functions of the base station conducting the agricultural operations may be implemented instead by one of the vehicles which may also be performing an agricultural operation.

Figure 6:
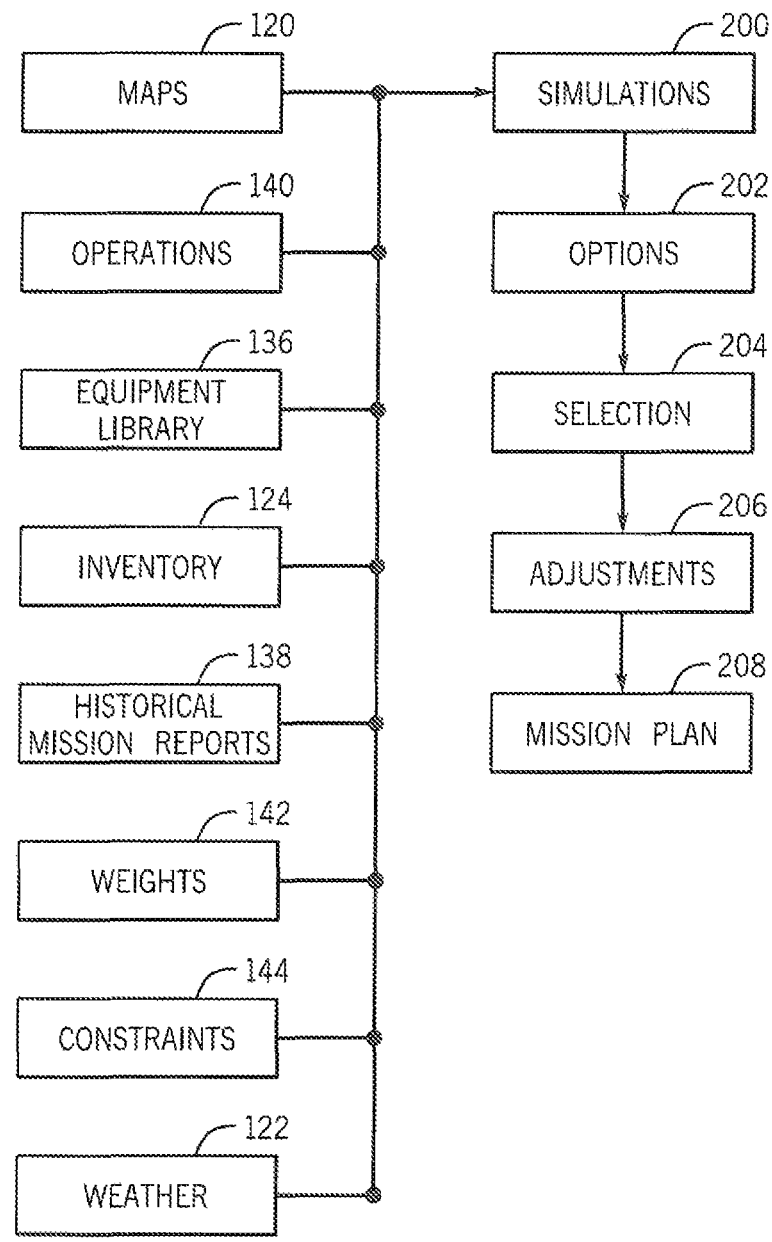
FIG. 6 is a flow chart illustrating a system for providing a mission plan for the system of FIG. 5.

Referring now to FIG. 6, a flow chart illustrating a system for providing a mission plan for the system of FIG. 5 is provided. Data from the data structures 110, including the maps 120, the weather maps 122, the inventory record 124, the equipment library 136, the historical data 138, the operation selection field 140, the weights 142 and the constraints 144, may be simulated by the computer processing system 100 in block 200. Next, in block 202, options for multiple mission plans may be presented to a user via graphic display of the I/O terminal 106. Options may include a highest probability mission plan based on the operations, weights and constraints provided, followed by lower probability mission plans which may apply greater emphasis to other factors such as historical data. Next, in block 204, the user may select a mission plan for execution via the I/O terminal 106. Next, in block 206, the user may make manual adjustments to the selected mission plan as desired. Finally, in block 208, the mission plan may be communicated to the vehicles 10 and/or other equipment for mission execution and deployment of equipment at designated times, as indicated by block 180 of FIG. 5.

Figure 7:
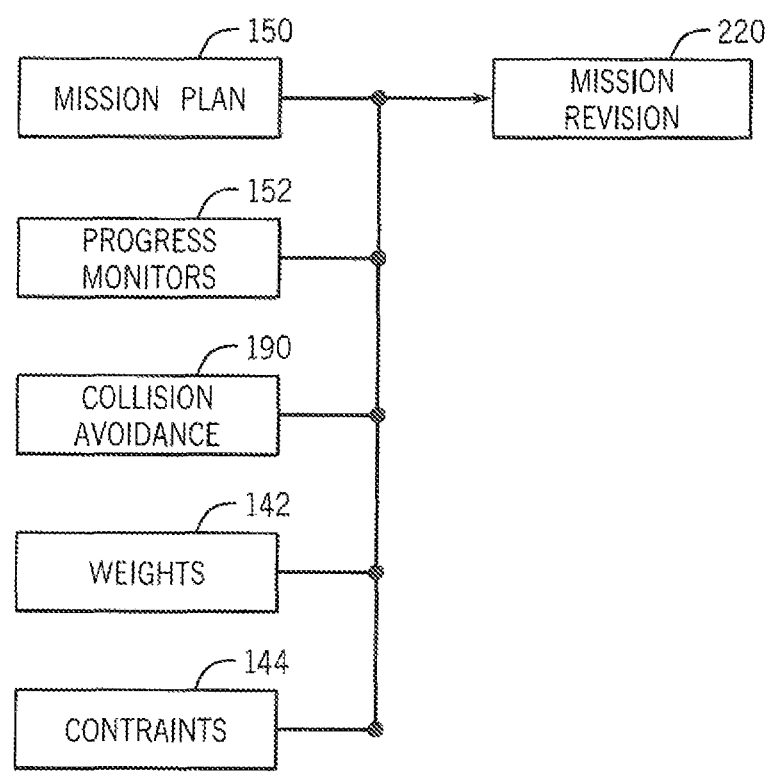
FIG. 7 is a flow chart illustrating a system for providing a revised mission plan for the system of FIG. 5.

Referring now to FIG. 7, a flow chart illustrating a system for providing a revised mission plan for the system of FIG. 5 is provided. Data from the mission plan 150, the progress monitors 152, the weights 142 and the constraints 144 may be simulated by the computer processing system 100. In addition, the collision avoidance process may be executed the computer processing system 100, including as described above with respect to block 190 of FIG. 5. Next, in block 220, the mission revision may be provided and communicated to the vehicles 10 and/or other equipment for execution, as indicated by block 188 of FIG. 5.

Multiple mission revisions may be presented as options and/or adjustments may be made before communicating to vehicles 10 for execution, similar to providing a mission plan as described above with respect to FIG. 6. However, in a preferred aspect, a highest probability mission revision is communicated quickly to affected vehicles 10 to ensure timely resolution of an event condition.

Figure 8A:
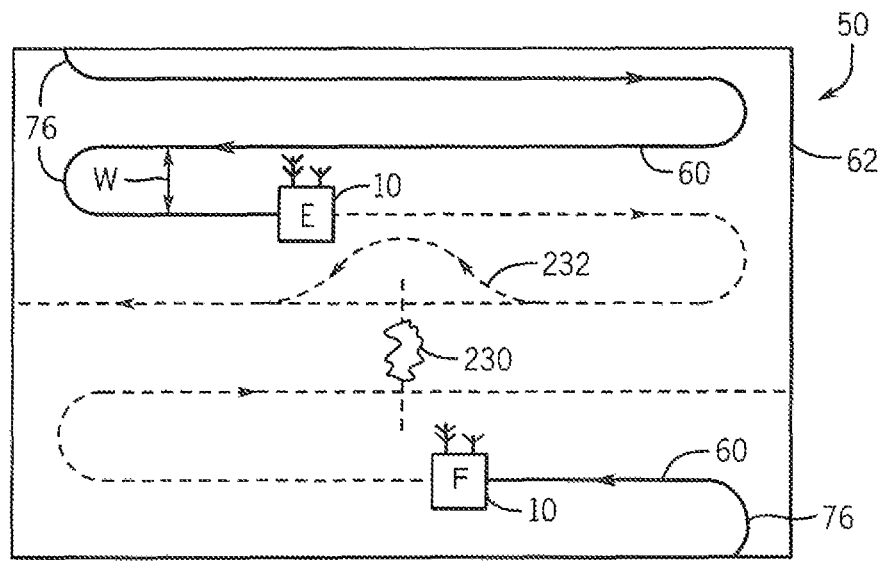
FIG. 8A is an exemplar diagram illustrating a possible collision due to vehicles traveling in opposite directions in adjacent paths with subsequent collision avoidance.

Referring now to FIG. 8A, an exemplar diagram illustrating a possible collision due to vehicles traveling in opposite directions in adjacent paths with subsequent collision avoidance is provided in accordance with an aspect of the invention. While conducting agricultural operations in the field 50, vehicles 10, labeled "E" and "F" by way of example, may be traveling toward a collision 230 due to upcoming travels in opposite directions on adjacent rows. Either vehicle E or vehicle F, or both vehicle E and vehicle F, or another equipment in the system, may detect and report this event condition. Upon receiving this event condition, the base station may provide a revised mission plan to avoid the collision 230. The base station may apply a predetermined, established hierarchy in which vehicle E is prioritized above vehicle F. Accordingly, the base station may provide a revised mission plan in which vehicle E will give way by adjusting the path of vehicle E to a collision avoidance path 232, based on the established hierarchy, to avoid the collision 230.

Figure 8B:
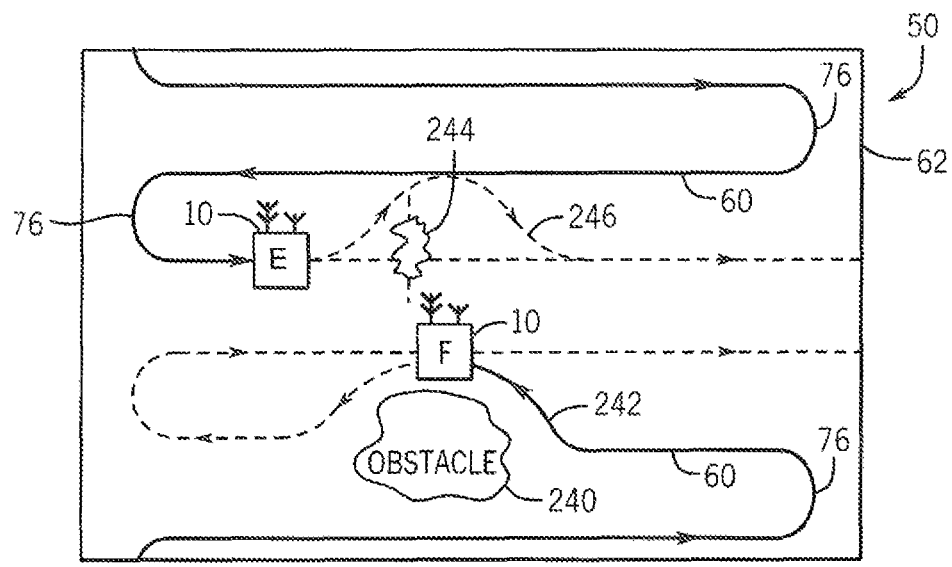
FIG. 8B is an exemplar diagram illustrating a possible collision due to a vehicle avoiding an unexpected obstacle with subsequent collision avoidance, each in accordance with an aspect of the invention.

Referring now to FIG. 8B, an exemplar diagram illustrating a possible collision due to a vehicle avoiding an unexpected obstacle with subsequent collision avoidance is provided in accordance with an aspect of the invention. While conducting agricultural operations, vehicles 10, again shown as vehicles E and F by way of example, may be in the field 50. Vehicles E and F may each be traveling in paths according to a mission plan which assures collision avoidance. However, vehicle F may detect an unexpected obstacle 240, which vehicle F may report as an event condition. Upon receiving this event condition, the base station may provide a revised mission plan to avoid the obstacle 240 by adjusting the path of vehicle F to an obstacle avoidance path 242. However, the obstacle avoidance path 242 may cause vehicle F travel toward a collision 244 due to travels in opposite directions on adjacent rows. Consequently, the base station may include in the revised mission plan a collision avoidance path 246 for vehicle F.

Figure 9:
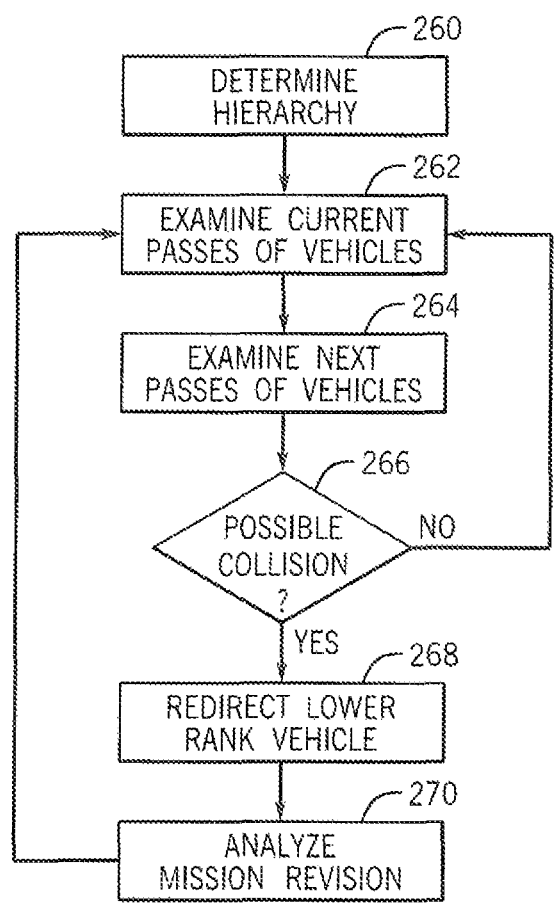
FIG. 9 is a flow chart illustrating a collision avoidance process in accordance with an aspect of the invention.

Referring now to FIG. 9, a flow chart illustrating a collision avoidance process is provided in accordance with an aspect of the invention. In block 260, each vehicle being used for the operation may be placed in a hierarchy (ranked). This hierarchy may be used for conflict resolution to determine which vehicle has the right of way and which vehicle will give way.

Next, in block 262, to avoid a collision, the collision avoidance process may analyze a current pass of each vehicle, and in block 264, a next planned pass of each vehicle. The passes may be analyzed and compared to determine if any vehicles may pass in opposite directions on the same or adjacent paths. In decision block 266, if it is discovered that any vehicles may pass in opposite directions on the same or adjacent paths, the collision avoidance process may proceed to block 268 in which the path for a lower ranked vehicle in the hierarchy may be redirected to avoid the potential collision in a revised mission. Redirection of the vehicle with lower rank in the hierarchy may include, for example, moving the vehicle to a new path/pass that will avoid the collision, or stopping the vehicle and waiting at the end of a current pass. Next, in block 270, remaining portions of the mission plan may be analyzed for re-construction and re-optimization, which may be based on current agricultural conditions such as those provided by the progress information of vehicles in the system. If an optimization may be realized, the revision plan may be further updated.

The present invention may be part of a "safety system" used to protect human life and limb in a field, construction or other environment. Nevertheless, the term "safety," "safely" or "safe" as used herein is not a representation that the present invention will make the environment safe or that other systems will produce unsafe operation. Safety in such systems depends on a wide variety of factors outside of the scope of the present invention including: design of the safety system, installation and maintenance of the components of the safety system, and the cooperation and training of individuals using the safety system. Although the present invention is intended to be highly reliable, all physical systems are susceptible to failure and provision must be made for such failure.

Although the best mode contemplated by the inventors of carrying out the present invention is disclosed above, practice of the above invention is not limited thereto. It will be manifest that various additions, modifications and rearrangements of the features of the present invention may be made without deviating from the spirit and the scope of the underlying inventive concept.

We claim:

1. A method for conducting agricultural operations in a field, comprising:
   providing a first autonomous vehicle and a second autonomous vehicle, each of the first autonomous vehicle and the second autonomous vehicle including agricultural machinery for performing a desired agricultural operation wherein at least one of the field, crops in the field, and crop residue in the field is acted upon;
   providing a mission plan for first and second autonomous vehicles, the mission plan including a first path and a second path for the first and second autonomous vehicles to travel while the agricultural machinery of the first autonomous vehicle performs a first agricultural operation on at least one of the field, crops in the field, and crop residue in the field along the first path and the agricultural machinery of the second autonomous vehicle performs a second agricultural operation on at least one of the field, crops in the field, and crop residue in the field along the second path, respectively;
   establishing a hierarchy wherein the first autonomous vehicle is prioritized above the second autonomous vehicle;
   performing the first agricultural operation with the first autonomous vehicle and the second agricultural operation with the second autonomous vehicle in a predetermined order, the first agricultural operation being different than the second agricultural operation;
   monitoring for an event condition reported by at least one of the first and second autonomous vehicles, the event condition being a detection of the first and second autonomous vehicles traveling toward a collision with respect to one another; and
   upon receiving the event condition, providing a revised mission plan for the second autonomous vehicle, wherein the revised mission plan adjusts the second path of the second autonomous vehicle based on the hierarchy to avoid the collision.

2. The method of claim 1, further comprising the event condition being a detection of the first and second autonomous vehicles traveling in opposite directions in a common path.

3. The method of claim 1, further comprising the event condition being a detection of the first and second autonomous vehicles traveling in opposite directions in adjacent paths.

4. The method of claim 1, further comprising receiving progress information from the first and second autonomous vehicles indicating progress with respect to the first agricultural operation and the second agricultural operation, respectively.

5. The method of claim 4, wherein the progress information includes a position of the autonomous vehicle with respect to the path.

6. The method of claim 4, wherein the progress information includes at least one of an amount of product collected and an amount of product dispensed.

7. The method of claim 1, further comprising determining the revised mission plan according to at least a first weight indicating an importance of completion time and a second weight indicating an importance of agricultural efficiency.

8. The method of claim 1, further comprising determining the revised mission plan according to first and second constraints requiring maximum speeds for the first and second autonomous vehicles, respectively, while performing the agricultural operation.

9. The method of claim 1, further comprising the mission plan including conducting the first agricultural operation in an area of a field before conducting the second agricultural operation in the area.

10. The method of claim 9, wherein the first agricultural operation is harvesting and the second agricultural operation is tilling.

11. A system for managing agricultural operations, the system including a processor executing a program stored in a non-transient medium operable to:

provide a mission plan for first and second autonomous vehicles wherein each of the first autonomous vehicle and the second autonomous vehicle includes agricultural machinery for performing a desired agricultural operation wherein at least one of the field, crops in the field, and crop residue in the field is acted upon, the mission plan including a first path and a second path for the first and second autonomous vehicles to travel while the agricultural machinery of the first autonomous vehicle performs a first agricultural operation on at least one of the field, crops in the field, and crop residue in the field along the first path and the agricultural machinery of the second autonomous vehicle performs a second agricultural operation on at least one of the field, crops in the field, and crop residue in the field along the second path, respectively;

establish a hierarchy wherein the first autonomous vehicle is prioritized above the second autonomous vehicle;

performing the first agricultural operation with the first autonomous vehicle and the second agricultural operation with the second autonomous vehicle in a predetermined order, the first agricultural operation being different than the second agricultural operation;

monitor for an event condition reported by at least one of the first and second autonomous vehicles, the event condition being a detection of the first and second autonomous vehicles traveling toward a collision with respect to one another; and upon receiving the event condition, provide a revised mission plan for the second autonomous vehicle, wherein the revised mission plan adjusts the second path of the second autonomous vehicle based on the hierarchy to avoid the collision.

12. The system of claim 11, wherein the event condition is a detection of the first and second autonomous vehicles traveling in opposite directions in a common path.

13. The system of claim 11, wherein the event condition is a detection of the first and second autonomous vehicles traveling in opposite directions in adjacent paths.

14. The system of claim 11, further comprising to receive progress information from the first and second autonomous vehicles indicating progress with respect to the first agricultural operation and the second agricultural operation, respectively.

15. The system of claim 14, wherein the progress information includes a position of the autonomous vehicle with respect to the path.

16. The system of claim 14, wherein the progress information includes at least one of an amount of product collected and an amount of product dispensed.

17. The system of claim 11, further comprising to determine the revised mission plan according to at least a first weight indicating an importance of completion time and a second weight indicating an importance of agricultural efficiency.

18. The system of claim 11, further comprising to determine the revised mission plan according to first and second constraints requiring maximum speeds for the first and second autonomous vehicles, respectively, while performing the agricultural operation.

19. The system of claim 11, further comprising the mission plan including conducting the first agricultural operation in an area of a field before conducting the second agricultural operation in the area.

20. The system of claim 19, wherein the first autonomous vehicle is a harvester and the second autonomous vehicle is a tiller.

* * * * *